B. F. VICKERY.
FRICTION TOOL HOLDER.
APPLICATION FILED JULY 8, 1909.

993,421.

Patented May 30, 1911.

Witness
Ja. adams
W. L. Long

Inventor
Benjamin F. Vickery
Jno. A. Buchanan
Attorney

UNITED STATES PATENT OFFICE.

BENJAMIN F. VICKERY, OF GIRARD, ALABAMA.

FRICTION TOOL-HOLDER.

993,421.     Specification of Letters Patent.     Patented May 30, 1911.

Application filed July 8, 1909. Serial No. 506,511.

*To all whom it may concern:*

Be it known that I, BENJAMIN F. VICKERY, a citizen of the United States, residing at Girard, in the county of Russell and State of Alabama, have invented new and useful Improvements in Friction Tool-Holders, of which the following is a specification, it being understood that various changes in the form, proportions, size, and minor details of the structure may be made without departing from the spirit or sacrificing any of the advantages of the invention.

My invention relates to improvements in friction tool holders; the objects of which are, first, to provide a tool holder in which the tool or cutter cannot slip or "chatter"; second, to enable the operator to instantly and accurately adjust the said tool or cutter; third, to eliminate set screws, attendant lost time and expense caused by their use; fourth, to prevent the breaking of tools or cutters caused by set screws.

I attain these objects by the mechanism shown in the accompanying drawing, in which—

Figure 1:
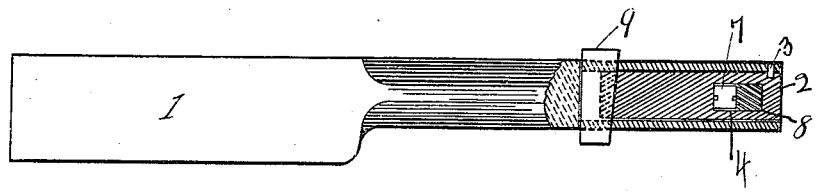
Figure 2:
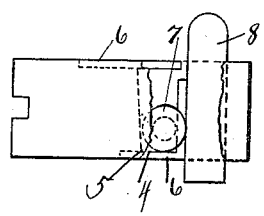
Figure 3:
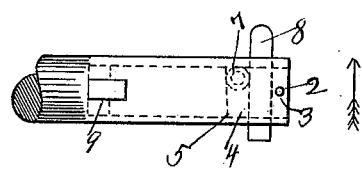
Figure 4:
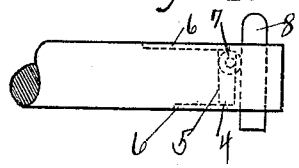

Figure 1, is a horizontal side elevation partly broken away, showing the interior mechanism of this tool; Fig. 2, is an enlarged plan view of the tool carrier shown at 2 in Fig. 1; Fig. 3, is a plan view of the front portion of the holder, showing the interior by dotted lines; Fig. 4, is a plan view of the front end of the tool holder, as it is made for soft metals and light work.

Similar numerals refer to similar parts throughout the several views.

1 is the tool holder proper, which is made of any suitable material; one end is designed to engage the usual fastenings of lathes, planers, shapers or other machines on which it is to be used; while the opposite end is shaped and bored to receive the tool carrier 2. The said tool carrier 2, is composed of a metal plug, constructed in such a manner as to fit inside of the front end of the tool holder 1, and is held in proper position by a guide pin 3, in the outer wall of the said tool holder 1, and which engages a longitudinal groove in the said tool carrier 2. The front end of the said tool carrier 2, is provided with a rectangular slot 4, disposed at any desired angle, and located a short distance from the extreme outer end; one side of the rectangular slot 4, forming an inclined plane 5. Inside of the said rectangular slot 4, resting on the said inclined plane 5, and prevented from dropping out of position by retainers 6, is a friction roller 7, adapted to engage the tool or cutter 8, when it is moved in a backward direction.

In Fig. 4, is shown a very desirable method of constructing this tool holder for soft metals and general light work; it has no tool carrier 2, but has the rectangular slot 4, which is made in the forward end of the holder 1; otherwise it is the same as shown in the other figures; this plan is not practical in the larger tools, owing to the fact that the rectangular slot 4, is so large it would weaken the said holder 1 to such an extent it would break.

To operate this device it is secured to machines in the usual way, and when the cutter 8, is to be removed for any reason, it is withdrawn in the direction of the arrow shown in Fig. 3. It is replaced in the same direction and is moved forward a suitable distance and pressure applied in a direction opposite to the arrow, thereby causing the friction roller 7, to move along the inclined plane until the cutter 8, is held firmly. In case the cutter should be a little too small the key 9, is driven down until it causes the friction roller 7, to tighten on the said cutter 8.

Having thus described my invention what I claim and desire to secure by Letters Patent is—

1. In a friction tool holder, the combination of a longitudinal metal bar, one end of which constitutes the shank or body of the tool, while the opposite end is designed to carry a cutting member carrier or clamping member, which combines a metal plug having a rectangular slot near one end, disposed at any desired angle, one side of the said rectangular slot forming an inclined plane, a movable friction member, and means for retaining the said movable friction member in position, substantially as shown and described.

2. A friction tool holder, comprising a longitudinal metal bar, one end of which constitutes the shank or body of the tool, the opposite end having a rectangular slot disposed at any desired angle, one side of the said rectangular slot forming an inclined plane, a movable friction member in said rectangular slot, adapted to engage a cutting member, and means for retaining the said movable friction member in position, substantially as shown and described.

In testimony that I claim the foregoing as my own I have hereto signed my name in the presence of two witnesses.

BENJAMIN F. VICKERY.

Witnesses:
C. T. GIFFORD,
G. M. HOOD.

Copies of this patent may be obtained for five cents each, by addressing the "Commissioner of Patents, Washington, D. C."